Dec. 27, 1966  D. W. DANIEL  3,293,987
METHOD OF GEAR SHAVING
Filed June 1, 1965
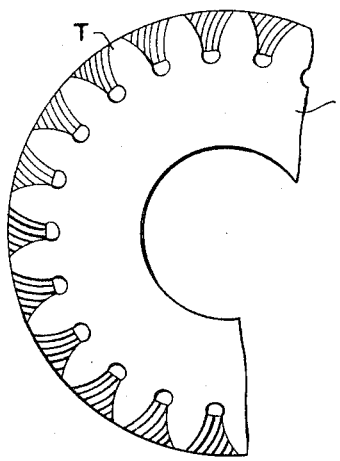
FIG. 1
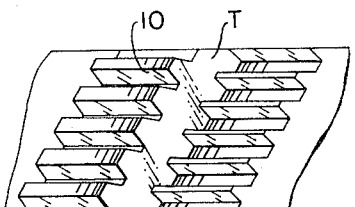
FIG. 2
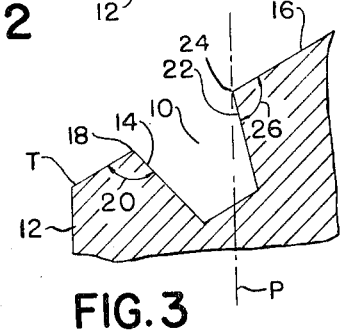
FIG. 3
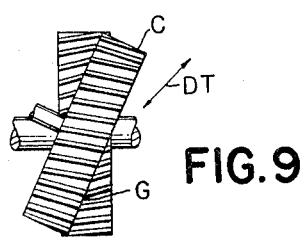
FIG. 9
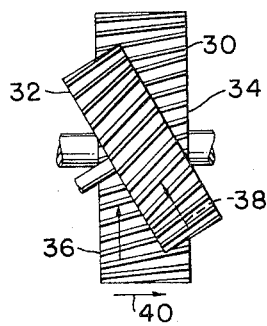
FIG. 4
FIG. 7  FIG. 8
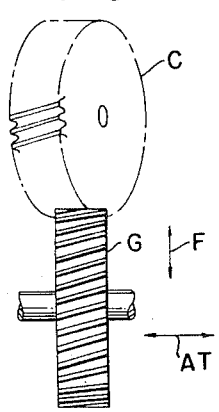
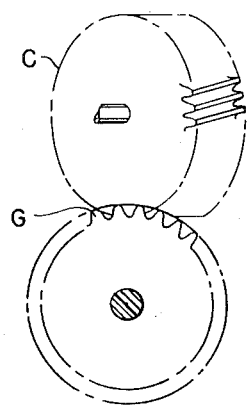
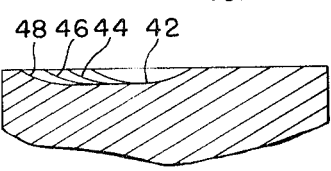
FIG. 5
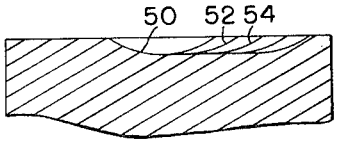
FIG. 6
INVENTOR.
DAVID W. DANIEL
BY Whittemore,
Hulbert & Belknap
ATTORNEYS 3,293,987
METHOD OF GEAR SHAVING
David W. Daniel, Birmingham, Mich., assignor to National Broach & Machine Company, Detroit, Mich., a corporation of Michigan
Filed June 1, 1965, Ser. No. 460,177
14 Claims. (Cl. 90—1.6)

The present invention relates to a method of gear shaving.

It is an object of the present invention to provide a method of gear shaving employing a specially modified cutter in which the method is characterized by the elimination of reversal in the direction of rotation which has heretofore been regarded as essential to produce substantially uniform surface finish and stock removal on opposite tooth flanks.

It is a further object of the present invention to provide a method of shaving gears as described in the preceding paragraph in which a relative traverse between a gear-like shaving cutter and a work gear in mesh therewith is effected during rotation thereof in a direction parallel to the axis of the gear.

It is a further object of the present invention to provide a method of gear shaving as described in the preceding paragraphs in which a relative traverse is provided between the meshed gear-like shaving cutter and a work gear during rotation thereof, which traverse occupies a plane parallel to the axes of both the gear and cutter and which extends at an oblique angle with respect to the axis of the work gear.

It is a further object of the present invention to provide a method for shaving gears as described in the preceding paragraphs in which relative movement between the gear-like shaving cutter and the work gear in mesh therewith during rotation thereof is limited to a plunge feed in a direction parallel to the common normal to the axes of the gear and cutter.

It is a further object of the present invention to provide a method of shaving gears as described in the foregoing paragraphs in which the gear-like shaving cutter is characterized in the provision of grooves or serrations in the flanks of its teeth which extend from top to bottom of the teeth to define cutting edges which substantially occupy planes perpendicular to the axis of the cutter, the sides of the grooves or serrations being inclined to intersect the flanks of the teeth to provide substantially equal obtuse included angles.

It is a further object of the present invention to provide a method of shaving gears as described in the foregoing paragraphs in which the gear-like shaving cutter is helical and is characterized in the provision of grooves or serrations in the flanks of its teeth which extend from top to bottom of the teeth to define cutting edges which substantially occupy planes perpendicular to the axis of the cutter, the sides of the grooves or serrations being inclined to intersect the flanks of the teeth to provide substantially equal included angles.

It is a further object of the present invention to provide a method of shaving gears as described in the foregoing paragraphs in which the gear-like shaving cutter is helical and is characterized in the provision of grooves or serrations in the flanks of its teeth which extend from top to bottom of the teeth to define cutting edges which substantially occupy planes perpendicular to the axis of the cutter, the sides of the grooves or serrations being inclined to intersect the flanks of the teeth to provide substantially equal obtuse included angles.

It is a further object of the present invention to provide a method of shaving gears employing a cutter as described in the preceding paragraph in which the obtuse included angles are between 100 and 110 degrees, and are preferably of about 105 degrees.

It is a further object of the present invention to provide a method of shaving gears employing a cutter as described in the preceding paragraph in which the relationship between the helix angle of the cutter and the included angle defined by the side walls of the grooves and the flanks of the teeth of the cutter is such that the included angles exceed 90 degrees by an angle less than the helix angle of the cutter and are between 100 and 110 degrees, and preferably are of about 105 degrees.

Other objects and features of the invention will become apparent as the description proceeds, especially when taken in conjunction with the accompanying drawings, illustrating a preferred embodiment of the invention, wherein:

FIGURE 1 is a perspective view of a cutter employed in the present invention.

FIGURE 2 is a top plan view of a single tooth of a cutter employed in the present invention.

FIGURE 3 is an enlarged fragmentary sectional view illustrating certain angular relationships required in a cutter to be used in the present invention.

FIGURE 4 is a diagrammatic view illustrating the angular relationship between a helical cutter and a gear in accordance with the present invention.

FIGURES 5 and 6 are fragmentary sectional views illustrating the different types of cut available in the practice of the present invention.

FIGURE 7 is a front elevational view of a gear and cutter in meshed relationship in accordance with the present invention.

FIGURE 8 is a side view of the gear and cutter seen in FIGURE 7.

FIGURE 9 is a plan view of the gear and cutter seen in FIGURE 7.

The present invention relates to gear shaving in which material is removed by a shaving operation from the flanks of the teeth of a work gear by rotating the work gear in mesh with a gear-like shaving cutter conjugate to the work gear but having its teeth extending at a different helix angle from the teeth of the gear so that for proper meshing engagement the axes of the gear and cutter cross in space.

It has been the practice to provide a shaving cycle in which a relative traverse motive is introduced between the gear and cutter in a plane parallel to the axes of both the gear and cutter. This relative traverse may be parallel to the axis of the gear in which case the shaving operation is referred to as conventional shaving. Alternatively, in accordance with known practices, the direction of relative traverse in the aforesaid plane may be in a direction oblique to the axis of the gear, in which case the gear shaving operation is described as diagonal traverse.

During each stroke of traverse the gear and cutter are maintained with their axes at a constant spacing and at or substantially at the end of each stroke of traverse a relative feed is introduced reducing the center distance or spacing between the axis of the gear and cutter by a predetermined amount which in turn determines the amount of material which will be removed on the next or return traverse stroke.

The operation is continued with back and forth traverse strokes or reciprocation, interspersed with the feeding strokes which reduce the center distance between the gear and cutter, until the gear is reduced to its exactly required size and the surfaces of its teeth are uniformly finished to accurate dimensions as required.

During the gear finishing operation either the gear shaving cutter or the tool is driven in rotation and the other of these members is mounted for free rotation so that the accuracy of cut is determined by the accuracy built into the gear shaving cutter and is not dependent on accuracy of complicated gear trains.

Up to the present time the universal practice has required a reversal in the direction of rotation of the gear and cutter during each cycle because of the fact that the cutting action on the driven flanks of the gear teeth was different from the cutting action on the opposite flanks, even though some cutting occurred on both flanks as a result of the cramp action resulting from the feeding motion at the ends of the intermediate traverse stroke.

It has heretofore been suggested to provide a gear finishing cycle in which relative traverse between the gear and cutter in a plane parallel to the axes of both was omitted and the only relative movement between the gear and cutter in addition to the meshed rotation thereof was a reduction in center distance or a plunge feeding. This operation was possible only when a cutter was employed having its serrations extending at a helix angle or lead. Such a cutter is disclosed in Mentley Patent 2,329,284.

The method of plunge feeding permits production of longitudinally uniform teeth by modification of the teeth of the cutter. In fact, by appropriate modification of the teeth of the cutter, crowned teeth may be produced on the work gear.

This method of plunge shaving as previously known was generally limited to situations in which the usual traverse stroke was impossible or was difficult to employ. In any case, it was particularly important in this operation to provide for a reversal in the direction of rotation during the finishing cycle of each gear, and generally to provide for rotation in each direction for approximately the same time.

In accordance with the present invention it is now possible to drastically reduce the time required to finish a gear because it is possible to produce substantially uniform finishing action at opposite sides of the teeth without the reversal in direction of rotation. In gear finishing operations repeated reversal in the direction of rotation in mid-cycle such as between each traverse stroke, results in a very considerable loss of time and in addition, requires more expensive motors having characteristics not required to practice the present invention.

The present invention is made possible by the development of a cutter which has substantially uniform cutting action with respect to both flanks of the teeth of a work gear in tight mesh therewith.

Referring now to the drawings, in FIGURE 1 there is a perspective view of a cutter C having helical teeth T, the teeth being provided with serrations or grooves substantially perpendicular to the axis of the gear and hence, substantially occupying the plane of rotation thereof.

In FIGURE 2 a single tooth T of the cutter is illustrated and a few of the grooves 10 are shown. It will be observed that each groove 10 extends parallel to the side surfaces 12 of the gear and hence, is perpendicular to its axis.

Referring now to FIGURE 3 a single one of the grooves 10 is illustrated and it will be observed that the groove comprises a generally flat side 14 which intersects the flank 16 of the tooth to provide a sharp cutting edge 18, the cutting edge being at the apex of the solid included angle 20. Similarly, the other side 22 of the groove 10 intersects the flank 16 to define a sharp cutting edge 24 at the apex of the solid included angle 26. In accordance with the present invention the included angles 20 and 26 are substantially equal and are moreover, obtuse angles between 100 and 110 degrees. Best results are obtained when the equal solid included angles 20 and 26 are approximately 105 degrees. Actually, the included angles could be greater except for the fact that the excessive divergence between the side walls causes too much change in the ratio between the land area between adjacent grooves and the space area at the grooves. The preferred included angle of 105 degrees represents a compromise at which satisfactory equal cutting or shaving action takes place at both sides of the gear teeth while at the same time resharpening the cutter by removing material from the flanks of its teeth does not objectionably change the ratio between the land and groove or space area.

It will be observed from FIGURE 3 that the side wall surface 22 of the groove 10 is undercut with reference to a plane parallel to the plane of rotation designated in this figure as P, and being parallel to the side surface 12 of the gear. This requires special techniques in the production of such a shaving cutter and method and apparatus for producing such a cutter is disclosed in my copending application Serial No. 424,623.

To understand the shaving action resulting from a crossed axes engagement between the gear and cutter, reference is now made to FIGURES 4–6. In these figures a gear 30 is illustrated as in mesh with a gear-like cutter 32. The gear is diagrammatically shown as having teeth 34 extending at a left hand helix of about 15 degrees and the cutter is shown as having a left hand helix of about 15 degrees with the result that the gear and cutter will mesh with their axes crossed at an angle of approximately 30 degrees. The direction of rotation is assumed to be as indicated by the arrows and the arrow 36 indicates that the visible surface of the gear, as viewed in FIGURE 4, is moving upwardly, while the arrow 38 indicates that the concealed side of the cutter 32 is moving upwardly and to the left. Accordingly, there is a relative sliding motion between the surfaces of the gear teeth and cutter which is to the left on the surfaces of the gear teeth. If the serrations on the teeth of the cutter were all in circumferential alignment and if there were no relative traverse between the gear and cutter in a plane parallel to the axes thereof (such for example as the plane of the figure in FIGURE 4), each time a particular tooth of the work gear passed through the zone of mesh it would be engaged by a cutting edge on a tooth of the cutter which always occupied the same position in space. Accordingly, this succession of cutting edges on the teeth of the cutter would initially cut a scallop on the tooth of the gear such for example as the scallop indicated at 42 in FIGURE 5.

If now, a slow traverse were introduced between the gear and cutter, as for example, traverse of the work to the right as seen in FIGURE 4, with rotation of the cutter as indicated by the arrow, by the time a particular tooth passed through mesh with the cutter a second time, the resulting relative displacement of the cutting edge would cause a second cut, in the nature of a conventional cut to be taken along the path indicated at 44. Successive conventional cuts would be taken along the lines 46, 48, etc.

Similar but not identical results can be obtained by employing a cutter in which the serrations or grooves are designed to extend at a lead or helix angle so that the second engagement between a particular tooth of the work gear and a tooth of the cutter will result in cutting action by a cutting edge on the cutter tooth which is displaced longitudinally of the tooth from the location of the cutting edge which made the preceding cut.

If the direction of rotation shown in FIGURE 4 were reversed it would of course be apparent that the direction of relative sliding between the surfaces of the teeth of the gear and cutter would be reversed and hence, that the cutting would be accomplished by cutting edges at the opposite sides of the grooves 10.

If the relative traverse between the cutter 32 and the gear 30 is reversed with rotation as shown in FIGURE 4 so that the gear moves to the left as viewed in this figure relative to the cutter 32, then the progression of cuts, assuming circumferentially aligned cutting edges, resulting from the feed is indicated by the cuts 50, 52, 54, etc. These cuts are caused to move to the right as seen in FIGURE 6 but are taken to the left so that the type of cutting which results is that which is usually referred to as climb cutting as opposed to conventional cutting.

Again, similar but not identical results in progression and distribution of cuts may be the result of an appropriate pattern of grooves in the teeth of the cutter, as for example, causing the most nearly aligned grooves to extend at a lead or helix angle opposite to those which produce the sequence of cuts illustrated in FIGURE 5.

Obviously, where the grooves or serrations extend at a lead or helix angle and where a relative traverse, either conventional traverse or diagonal traverse, is employed, the sequence of cuts may be appropriately controlled by relating the traverse to the arrangement of grooves, having regard to the number of teeth on the gear and the number of teeth on the cutter.

By providing the grooves in the flanks of the teeth of the cutter in the proper pattern, having regard of course to the number of teeth in the cutter, it is possible to provide for plunge feeding to result in a progression of cuts on each tooth of the gear by equal increments either to the right or to the left, and arrange to produce either climb cutting or conventional cutting. Experience has indicated that for substantially equal stock removal, for surface finish, and for the ability to control tooth form, conventional cutting is considerably more desirable than climb cutting. Accordingly, the number of teeth on the cutter and the pattern of the grooves or serrations is normally such as to produce a uniform continuous progression of cuts in a direction such that the cuts are conventional. It will be apparent of course that a change in the direction of rotation in this case will reverse both the direction of cut on the surface of the tooth as well as the direction of feed or the direction in which the cuts progress so that a change in the direction of rotation will not change the character of cut as between conventional and climb.

Accordingly, an important aspect of the present invention involves plunge cutting using a cutter provided with grooves in the tooth surfaces which have equal included angles of at least 90 degrees and preferably somewhat more, in which the grooves are arranged in a pattern with respect to the number of teeth in the gear and cutter such that each tooth on the gear is cut progressively in the same direction as a result of the displacement of the cutting edges on the different teeth of the cutter, and such that the progression is so related to the direction of cut as to produce conventional cutting, the method comprising rotating the gear and cutter in tight mesh and relatively feeding the gear and cuter toward each other along a line perpendicular to the axes of both gear and cutter while effectively preventing any relative traverse movement between the gear and cutter.

Referring now to FIGURES 7 and 8, for the purpose of illustrating the types of finishing action to which the present invention is applicable, the cutter C is in all cases illustrated as in mesh at the top of the gear G. The cutter has a helix angle such that the axes of the gear and cutter are crossed in space at a substantial angle, as for example, between 3 and 30 degrees, to permit tight mesh. By tight mesh, reference is made to a situation in which each tooth of the gear and cutter is solidly engaged on both flanks simultaneously as it passes through the zone of mesh.

Referring now to FIGURE 7, the arrow AT which is parallel to the axis of the gear, represents the direction of relative transverse between the gear and cutter for the axial traverse characteristic of conventional gear shaving. In practice, the cutter C is angularly adjustable in a fixed support in the illustrated position and is driven in rotation. The gear G is mounted on a slide movable in the required direction of relative traverse and is mounted for free rotation. In this figure the vertical arrow F represents the direction of feed. In conventional gear shaving or in diagonal traverse as will subsequently be described, relative feeding takes place between the gear and cutter substantially at the end of a stroke of traverse and preceding a subsequent stroke, to predetermine the amount of material which will be removed on the next stroke of traverse. Conveniently, this feed is accomplished by elevating the support which carries the gear although of course equivalent results may be obtained by downward movement of the support which carries the cutter.

Referring now to FIGURE 9, the arrow DT represents a direction of relative traverse between the gear G and the cutter C which will result in the gear finishing operation referred to as diagonal traverse. With this operation a relatively shorter traverse stroke may be employed and it has been found that a more rapid removal of stock is obtainable. With this operation relative feed in the direction of the arrow F in FIGURE 7 may or may not be required since the gear may be at the required final center distance prior to initiation of the traverse stroke.

The gear finishing operation described as plunge shaving is accomplished by locating the gear and cutter as illustrated for example in FIGURE 7, rotating them in mesh in either direction as required, and providing a relative feed in the direction of the arrow F without any other relative movement such as the traverse strokes in the directions AT or DT.

It has been found that by employing the cutter characterized in the provision of substantially equal obtuse included angle cutting edges at both sides of each groove, substantially uniform stock removal occurs on both sides of the gear teeth and a gear may be satisfactorily shaved without the necessity of reversing the direction of rotation.

In general, the new method of gear shaving requires that the included angle between the side walls of the grooves and the flanks of the teeth which form the cutting edges should be equal, and best results are obtained when the included angles of these cutting edges are at least 100 degrees and preferably between 100 and 110 degrees. However, the invention also includes within its scope a method in which the cutters employed have helical teeth with the side walls of the serrations so inclined that the included angle of the cutting edges is 90 degrees or greater and preferably is in excess of 90 degrees.

While in some cases it is not necessary, it is ordinarily preferable to provide longitudinal concavity on the teeth of the cutter so as to make them properly conjugate to unmodified teeth on the work gear when operated therewith at crossed axes.

While it has been indicated that the direction of rotation may be in either direction, it will be apparent that during the passage of each groove on a tooth of the cutter through the cutting zone, the direction of sliding action will determine which of the two cutting edges formed by each groove will be operative. In order to obtain maximum cutter life it will of course be desirable to provide for rotation of the cutter throughout its lifetime for substantially equal time in both directions. However, this does not require reversal of the direction of rotation and hence, reversal of the motor during each gear shaving cycle. Instead, it may be satisfactory to rotate a cutter in a single direction for a protracted period, as for example an hour or a day, after which the direction of rotation may be reversed to use the cutting edges which were inoperative during the first direction of rotation.

The drawings and the foregoing specification constitute a description of the improved method of gear shaving in such full, clear, concise and exact terms as to enable any person skilled in the art to practice the invention, the scope of which is indicated by the appended claims.

What I claim as my invention is:

1. The method of shaving gears which comprises running a gear member in tight mesh with a gear-like shaving cutter member having helical teeth conjugate to the teeth of the gear member, in which the teeth of the cutter member have grooves in their flanks extending in planes perpendicular to the axis of the cutter member, the side walls of the grooves being inclined to intersect the flanks of the teeth to form cutting edges, the included angles between the side walls of the grooves and the flanks of the teeth being substantially equal included angles of at least 90 degrees, positively driving one of said members in a single direction during the shaving operation, and driving the other member solely through the meshed engagement between said members.

2. The method of shaving gears which comprises running a gear member in tight mesh with a gear-like shaving cutter member having teeth conjugate to the teeth of the gear member, in which the teeth of the cutter member have grooves in their flanks extending in planes perpendicular to the axis of the cutter member, the side walls of the grooves being inclined to intersect the flanks of the teeth to form cutting edges, the included angles between the side walls of the grooves and the flanks of the teeth being substantially equal obtuse included angles, positively driving one of said members in a single direction during the shaving operation, and driving the other member solely through the meshed engagement between said members.

3. The method as defined in claim 2 in which the equal obtuse included angles are at least 100 degrees.

4. The method as defined in claim 2 in which the equal obtuse included angles are between 100 and 110 degrees.

5. The method as defined in claim 2 in which the cutter member is helical and the included angles are between 100 and 110 degrees, and in which the included angles less 90 degrees is less than the helix angle of the cutter member.

6. The method as defined in claim 5 which comprises providing a relative traverse stroke between said gear and cutter members in a plane parallel to the axes of both members to distribute the shaving action of the cutter member from end to end of the teeth of the gear member.

7. The method as defined in claim 5 in which the grooves on successive teeth extend at a lead thereon, which comprises preventing relative lateral movement between said gear and cutter members in any direction in a plane parallel to the axes of both of said members while providing a relative depth feed in a direction parallel to a line perpendicular to the axes of both of said members and rotating said members only in a single direction.

8. The method as defined in claim 7 in which the cutting edges on successive teeth are progressively displaced from true circumferential alignment.

9. The method of shaving gears wihch comprises meshing a gear at crossed axes and in tight mesh with a gear-like cutter having teeth provided with grooves extending generally in the plane of rotation of the cutter, the sides of the grooves intersecting the flanks of the teeth to form cutting edges having substantially equal included angles of at least 90 degrees, the grooves on successive teeth of the cutter being arranged to extend in one or more continuous leads, the number of teeth on the cutter being related to the number of teeth on the gear, and the pattern of grooves on the teeth of the cutter being such as to cause a progression of successive cuts along each tooth of the gear as it is rotated in tight mesh with the cutter, providing a relative depth feed between the gear and cutter along a path perpendicular to the axes of both the gear and cutter while preventing relative lateral movement between the gear and cutter.

10. The method as defined in claim 9 in which the direction of progression of cuts is related to the direction of cut such as to produce conventional cutting.

11. The method as defined in claim 9 in which the sides of the grooves intersecting the flanks of the teeth to form cutting edges have substantially equal obtuse included angles.

12. The method of shaving gears is defined in claim 11 in which the direction of progression is related to the direction of cut such as to produce conventional cutting.

13. The method as defined in claim 9 which comprises the step of providing a dwell at full depth for an interval sufficient to finish the surfaces of the gear teeth uniformly.

14. The method as defined in claim 9 in which the teeth of the cutter are longitudinally concave to provide for production of uniform teeth on the gear.

References Cited by the Examiner

UNITED STATES PATENTS 3,213,754   10/1965   Hurth et al. _____ 90—1.6

FOREIGN PATENTS 903,886   2/1954   Germany.

WILLIAM W. DYER, Jr., *Primary Examiner.*

G. A. DOST, *Assistant Examiner.*